May 26, 1936.  L. R. FRIEND  2,041,824
STORAGE BATTERY TERMINAL
Filed July 31, 1935

Inventor
L. R. Friend
By Clarence A. O'Brien
Attorney

Patented May 26, 1936

2,041,824

UNITED STATES PATENT OFFICE 2,041,824

STORAGE BATTERY TERMINAL

Lester R. Friend, Fort Wayne, Ind.

Application July 31, 1935, Serial No. 34,083

1 Claim. (Cl. 173—259)

This invention relates to electrical connections of the storage battery type.

An important object of the invention is to provide a non-corrodible means for attaching the terminals of circuit wires of the terminals of storage batteries and more expressly to provide non-corrodible means for attaching terminals of circuit wires of the present standard storage batteries without alterations in any of the standard parts now used upon storage batteries.

Other important objects and advantages of the invention will become apparent to the reader of the following specification.

In the drawing.

Referring to the drawing wherein like numerals designate like parts, it can be seen in Figure 2 that the letter A represents the top of the storage battery with letter B representing the upstanding post.

Figure 1:
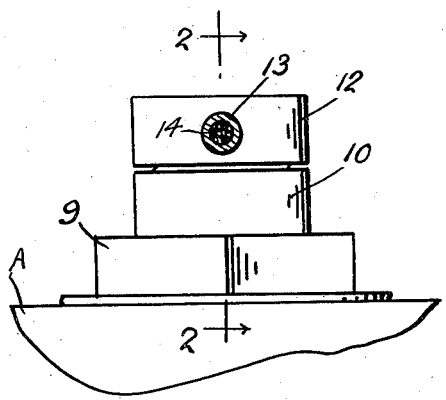
Figure 1 represents a side elevational view of the terminal.
Figure 2:
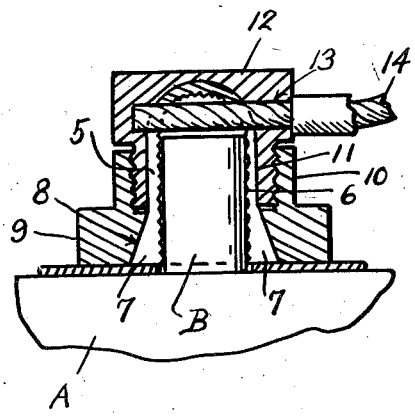
Figure 2 represents a vertical sectional view taken substantially on line 2—2 of Figure 1.
Figure 3:
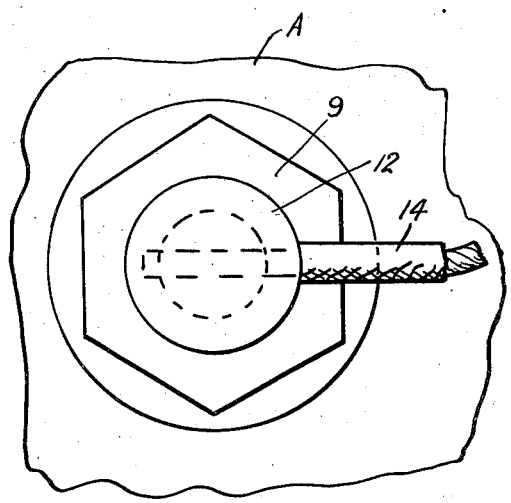
Figure 3 represents a top plan view of the terminal.
Figure 4:
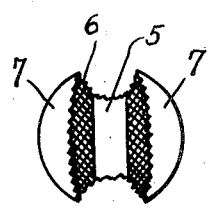
Figure 4 represents a bottom plan view of the clamp nipple.

As is shown in Figure 4, numeral 5 represents the bifurcated nipple provided with corrugations or teeth 6 formed on the inner side thereof. Downwardly flared foot portions 7 are provided on the spaced portions of the nipple for accommodating the tapering bore 8 of the nut 9 which fits downwardly against the top of the battery A in the manner shown in Figure 2. The nut 9 is provided with an upstanding internally threaded portion 10 for receiving the externally threaded depending apron portion 11 of the head 12. This head 12 is provided with an opening 13 in the side thereof which should be aligned with the opening through the bight portion of the nipple 5. It can now be seen that with the nipple on the post 6 and the nut 9 in the position shown in Figure 2, the apron 11 can be set upon the internally threaded portion 10 and by rotating the nut 9, the head 12 will be drawn downwardly, and obviously with the cable 14 inserted into the head in the manner shown in Figure 2 and also passing through the upper portion of the nipple 5, the cable will be brought down and clamped snugly against the top of the post B.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

A battery terminal comprising a bifurcated nipple for disposition over the post of a battery, said bifurcated nipple being provided at its end portion with tapered enlargements, a nut provided with a tapered bore for wedged engagement with the said enlargements, said nut being provided with an internally threaded portion, a head structure having an opening therein through which a cable can be inserted for disposition through the bifurcated nipple on the upper end of the post, said head being provided with a threaded portion for engagement to the threaded portion of the said nut so that when the said nut is rotated, the head will be drawn downwardly to cause the nipple to bind against the post and the cable to clamp against the said post.

LESTER R. FRIEND.